R. O. DOHM.
AUTOMATIC SUPPLY HOG FEEDER.
APPLICATION FILED JUNE 6, 1919.
1,341,887.
Patented June 1, 1920.
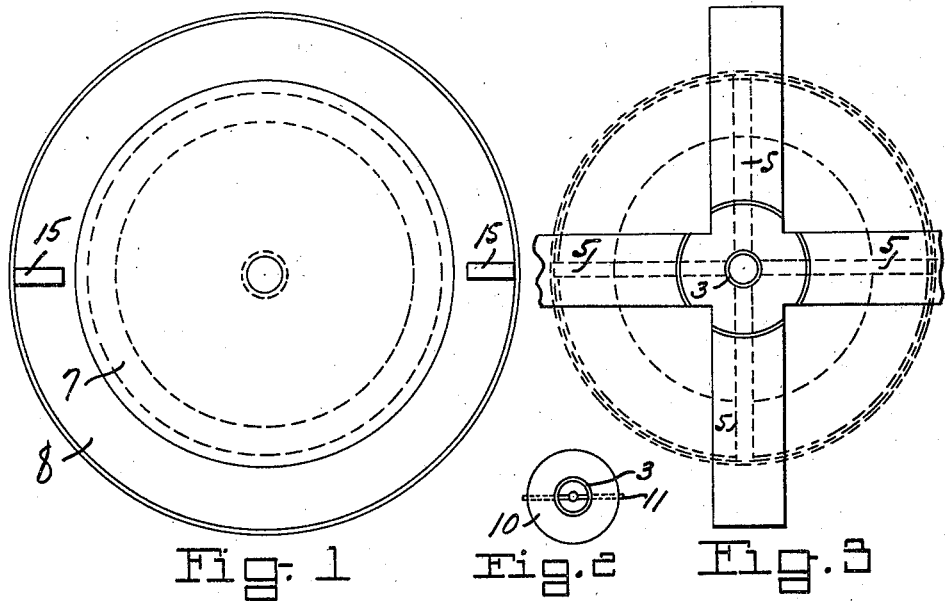
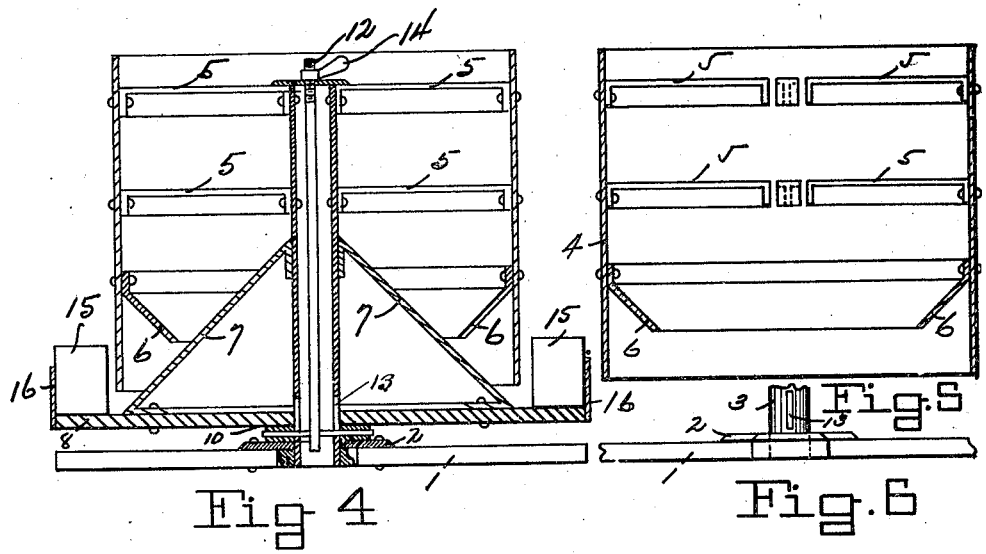
WITNESSES
William W. French
Margaret A. French
INVENTOR
Robert Olmere Dohm
BY Charles Albert French.
HIS ATTORNEY

UNITED STATES PATENT OFFICE.

ROBERT OTMERE DOHM, OF DANE, WISCONSIN.

AUTOMATIC-SUPPLY HOG-FEEDER.

1,341,887.      Specification of Letters Patent.      Patented June 1, 1920.

Application filed June 6, 1919. Serial No. 302,319.

*To all whom it may concern:*

Be it known that I, ROBERT OTMERE DOHM, citizen of the United States, residing at Dane, in the county of Dane and State of Wisconsin, have invented certain new and useful Improvements in Automatic-Supply Hog-Feeders, of which the following is a specification.

My invention relates to automatic supply hog feeders in which the grain is stored in a stationary hopper which discharges onto a revoluble feeding platform; and the objects of my invention are, first, to provide a device that can be anchored in any desired place; second, to afford facilities for storing the feed; and, third, to have the feed automatically supplied to the feeding platform when the same is revolved in either direction.

I attain these objects by the mechanism shown in the accompanying drawing in which—

Figure 1 is a plan of the feeding platform;

Fig. 2, is a plan of the support for the feeding platform;

Fig. 3, is a plan of the hopper and foundation, the hopper being shown in dotted lines;

Fig. 4, is a vertical section through the center of device;

Fig. 5, is a vertical section through the hopper;

Fig. 6, is a side elevation of the foundation and post, partly broken away.

Similar numerals refer to similar parts throughout the several views.

A foundation 1, a central plate 2, a hollow post 3, upon which a hopper 4, is rigidly mounted by means of radial braces 5, comprise the stationary frame of my device. The foundation 1, is constructed preferably of crossed timbers, the central plate 2, securing the same together and forming a step in which the hollow post 3, is secured at the bottom. Said post is provided with two slots 13, oppositely disposed adjacent its lower end for a purpose hereinafter explained.

The hopper 4, is cylindrical in form and is provided with an inclined shelf 6, at or near the bottom, and secured to the post 3, by two or more sets of braces 5. A feeding platform 8, circular in form provided with a band 16, around the outer edge is revolubly disposed on the post and rests upon a collar 10, also slidably mounted on the post. A conical member 7, is secured centrally on top of the platform 8, and extends upward and around the post to provide a top and supporting bearing for the platform. A pin 11, passes through the collar 10, and beyond through the two slots 13, before mentioned. A rod 12, is attached to the pin 11, at its center and extends upward through the post 3 and is threaded at the top to receive a threaded handle 14. It is obvious that by raising or lowering the platform 8, by means of the handle 14, the distance between the members 6, and 7, can be regulated. Two radially disposed cleats 15, are provided abutting the outer rim of platform 8, for animals to push against to revolve the same. Any suitable cover can be used for covering the hopper.

To use my device turn the handle 14, upon rod 12, until the platform 8, is raised sufficient to close the space between member 7, and bottom 6, of the hopper 4, then put dry feed or grain in the hopper and lower the platform until the proper supply is obtained when the platform is revolved.

Having thus described my invention I claim:

In a hog feeder, the combination with a foundation plate, a plate centrally disposed upon said foundation plate, a hollow post disposed in a central aperture and foundation plate and plate aforesaid and extending upward therefrom and provided with two slots adjacent its lower end, a hopper cylindrical in form disposed on said post, an inclined shelf disposed within said hopper and rigidly secured to said hopper, a collar slidably mounted on said post, a platform circular in form revolubly disposed on said post and resting on said collar, a band disposed peripherally of said platform and extending a distance upward therefrom, a conical member secured centrally on top of the platform and extending upward and around the post providing a top and supporting bearing for the platform, a pin passing through collar aforementioned and through slots in said post, a rod attached to said pin and extending upward through the post, said rod provided with a threaded portion, a handle disposed on said threaded portion of said rod for raising and lowering the said platform thereby regulating the distance between the aforesaid conical member and said inclined shelf within the hopper.

In testimony whereof I affix my signature in the presence of two subscribing witnesses.

ROBERT OTMERE DOHM.

Witnesses:
HERMAN J. KURT,
E. F. DeBOWER.